(12) United States Patent
Shridhar et al.

(10) Patent No.: US 7,406,042 B1
(45) Date of Patent: Jul. 29, 2008

(54) METHOD AND APPARATUS FOR DYNAMIC MULTI-LINE BONDING IN COMMUNICATION SYSTEMS

(75) Inventors: Avadhani Shridhar, Santa Clara, CA (US); Behrooz Rezvani, San Ramon, CA (US); Sushil Agarwal, San Jose, CA (US); Alfred Mui, Fremont, CA (US); Masoud Eskandari, San Jose, CA (US)

(73) Assignee: Ikanos Communication Inc, Fremont, CA (US)

( * ) Notice: Subject to any disclaimer, the term of this patent is extended or adjusted under 35 U.S.C. 154(b) by 1398 days.

(21) Appl. No.: 10/290,973

(22) Filed: Nov. 7, 2002

Related U.S. Application Data

(60) Provisional application No. 60/346,346, filed on Dec. 28, 2001, provisional application No. 60/337,727, filed on Nov. 7, 2001.

(51) Int. Cl.
  H04L 12/26 (2006.01)
  H04L 12/28 (2006.01)
  H04J 1/00 (2006.01)
(52) U.S. Cl. .................... 370/230; 370/420; 370/485
(58) Field of Classification Search ......... 370/230–235, 370/400, 401, 419–421, 437–439, 485–490
  See application file for complete search history.

(56) References Cited

U.S. PATENT DOCUMENTS

| | | | | |
|---|---|---|---|---|
| 4,864,567 A | * | 9/1989 | Giorgio | 370/359 |
| 5,144,625 A | * | 9/1992 | Cain et al. | 370/522 |
| 6,175,570 B1 | * | 1/2001 | Cukier et al. | 370/414 |
| 6,188,669 B1 | * | 2/2001 | Bellenger | 370/230 |
| 6,324,184 B1 | * | 11/2001 | Hou et al. | 370/468 |
| 6,754,221 B1 | * | 6/2004 | Whitcher et al. | 370/401 |
| 6,754,233 B1 | * | 6/2004 | Henderson et al. | 370/493 |
| 6,798,769 B1 | * | 9/2004 | Farmwald | 370/352 |
| 6,963,579 B2 | * | 11/2005 | Suri | 370/420 |
| 7,133,441 B1 | * | 11/2006 | Barlev et al. | 375/222 |

OTHER PUBLICATIONS

Richard Cam et al., Inverse Multiplexing for ATM (IMA) Specification Version 1.1, Mar. 1999, The ATM Forum Technical Committee.

* cited by examiner

*Primary Examiner*—Wing F Chan
*Assistant Examiner*—Hong Sol Cho
(74) *Attorney, Agent, or Firm*—IP Creators; Charles C Cary

(57) ABSTRACT

A bundler, un-bundler and sequencer for use in controlling and driving opposing sets of logical or physical modems to drive multiple-subscriber lines with multiple communication channels. The sequencer determines subscriber requirements such as maximum and minimum bandwidth and quality of service. The sequencer also determines bandwidth availability and status of multiple subscriber lines from which a bundle may be formed. The bundler couple to the sequencer and implement header or headerless insertion of multiple channels in round robin sequence into the X-DSL frames at data rates which correspond with subscriber requirements. The un-bundler reverses the process of the bundler and passes the appropriate packet data onto the corresponding network.

9 Claims, 7 Drawing Sheets

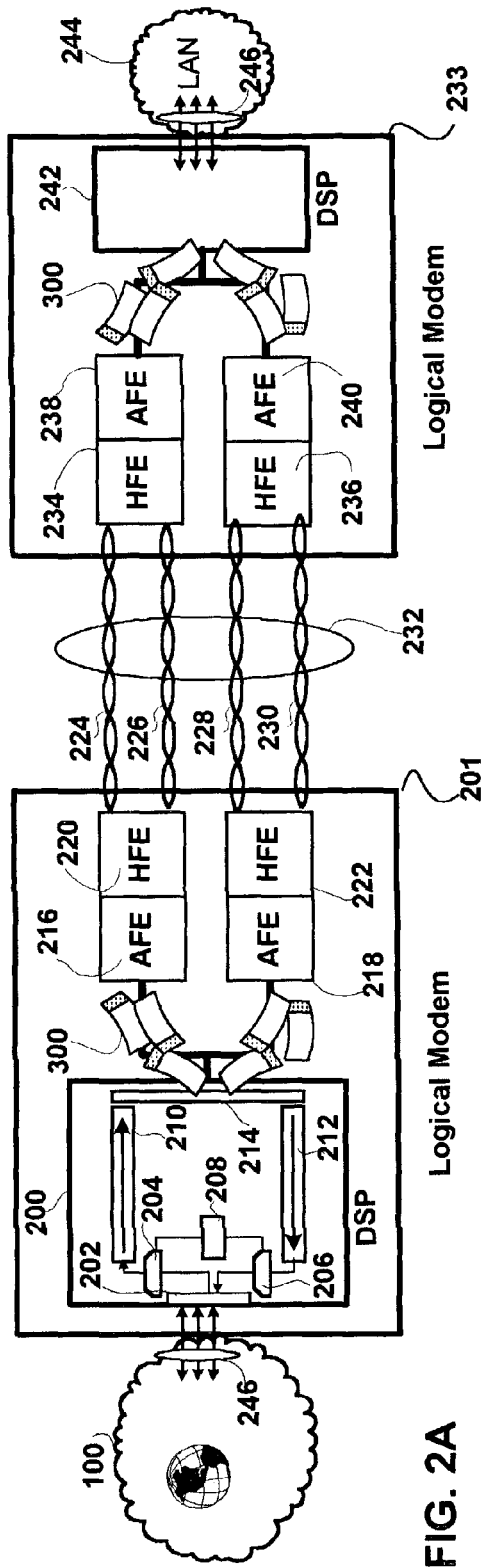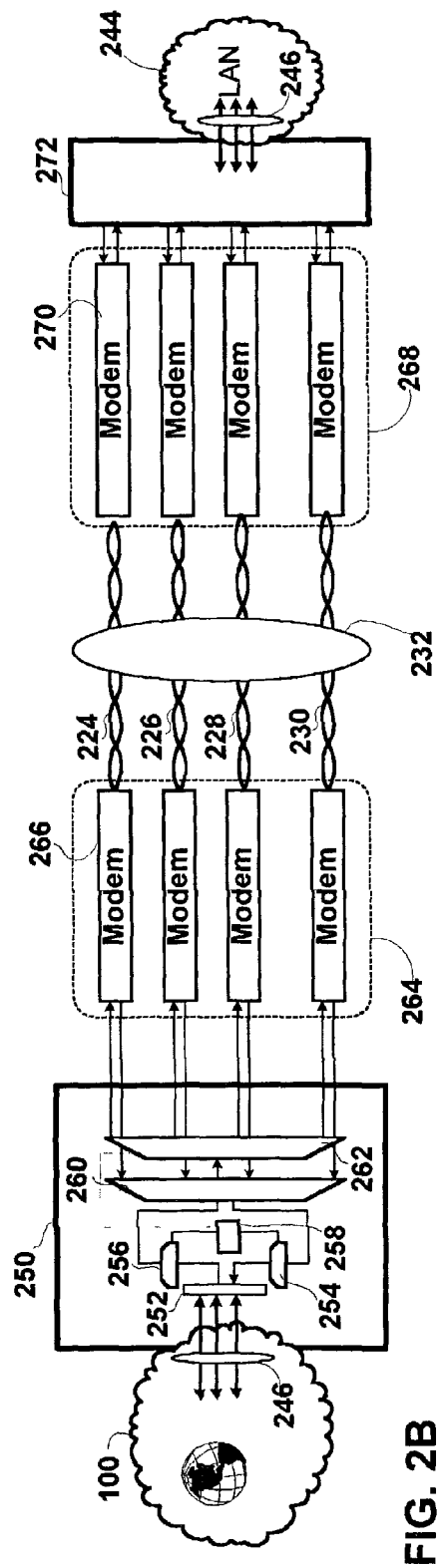
FIG. 2A
FIG. 2B

Bundle Table

| Resource | Channel Physical | Round Robin Sequence | Protocol | Status | Symbol Size UpStream | Sym Size DnStr |
|---|---|---|---|---|---|---|
| AFE 216 | 224 | 1 | VDSL | Run | 1000 | ... |
|  | 226 | 4 | VDSL | ... | 800 | ... |
| AFE 218 | 228 | 2 | ADSL | Run | 0400 | ... |
|  | 230 | 3 | ADSL | ... | 0500 | ... |
|  |  |  |  |  | Total | Total |

FIG. 4A

Subscriber Table

| Ethernet Port | Bandwidth Guarantee | Bandwidth Cap | QOS |
|---|---|---|---|
| A | 1.00Mb/s | None | 1 |
| B | .25Mb/s | 1.00Mb/s | 3 |
| C | .25Mb/s | .25Mb/s | 10 |

FIG. 4B

Frame Partition Table

| Ethernet Port | Channel Phy=224 | Channel Phy=226 | Channel Phy=228 | Channel Phy=230 |
|---|---|---|---|---|
| A | 500 | 400 | 200 | 250 |
| B | 300 | 150 | 120 | 150 |
| C | 200 | 100 | 80 | 100 |

FIG. 4C

| Partition Seq | Ch 224 | Ch 226 | Ch 228 | Ch 230 |
|---|---|---|---|---|
| 1 | A | A | A | A |
| 2 | B | B | B | B |
| 3 | C | C | C | C |

| Partition Seq | Ch 224 | Ch 226 | Ch 228 | Ch 230 |
|---|---|---|---|---|
| 1 | A | A | A | A |
| 2 | B | B | B | B |
| 3 | C | A | A | C |

FIG. 4D    Port SequenceTable Instances    FIG. 4E

BONDING WITH HEADERS

METHOD AND APPARATUS FOR DYNAMIC MULTI-LINE BONDING IN COMMUNICATION SYSTEMS

CROSS REFERENCE TO RELATED APPLICATION

This application claims the benefit of prior filed now abandoned Provisional Application Nos. 60/337,727 filed on Nov. 7, 2001 entitled "Multi-line DSL Phy Layer Bonding" and No. 60/346,346 filed on Dec. 28, 2001 entitled "Multi-PHY Operation" both of which are incorporated herein by reference in their entirety as if fully set forth herein.

BACKGROUND OF THE INVENTION

1. Field of Invention

This invention relates generally to communications, and more particularly, to a method and apparatus for multi-line bonding of digital subscriber line communications.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as xDSL have been developed to increase the effective bandwidth of existing subscriber line connections, without requiring the installation of new fiber optic cable. An xDSL modem operates at frequencies higher than the voiceband frequencies, thus an xDSL modem may operate simultaneously with a voiceband modem or a telephone conversation.

Currently there are over ten discrete xDSL standards, including: G.Lite, ADSL, VDSL, SDSL, MDSL, RADSL, HDSL, etc. Within each standard there are at least two possible line codes, or modulation protocols, discrete multi-tone (DMT) and carrierless AM/PM (CAP). A typical DMT system utilizes a transmitter inverse fast Fourier transform (IFFT) and a receiver fast Fourier transform (FFT). The following patents are related to DMT modems: U.S. Pat. No. 5,400,322 relates to bit allocation in the multicarrier channels; U.S. Pat. No. 5,479,447 relates to bandwidth optimization; U.S. Pat. No. 5,317,596 relates to echo cancellation; and U.S. Pat. No. 5,285,474 relates to equalizers. The following patents are related to CAP modems: U.S. Pat. No. 4,944,492 relates to multidimensional passband transmission; U.S. Pat. No. 4,682,358 relates to echo cancellation; and U.S. Pat. No. 5,052,000 relates to equalizers. Each of these patents is incorporated by reference as if fully set forth herein.

XDSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop.

Modems using CAP or DMT or other line codes, essentially have three hardware sections: (a) an analog front end (AFE) to convert the analog signals on the subscriber line into digital signals and convert digital signals for transmission on the subscriber line into analog signals, (b) digital signal processing (DSP) circuitry to convert the digital signals into an information bitstream and optionally provide error correction, echo cancellation, and line equalization, and (c) a host interface between the information bitstream and its source/destination. Typically all of these components are located on a highly integrated single line card with a dedicated connection between one or more AFE's and a DSP.

Each installation represents a sizeable expense in hardware and service labor to provision the central office. The expense may not always be amortized over a sufficient period of time due the relentless introduction of new and faster xDSL standards each of which pushes the performance boundaries of the subscriber line in the direction of increasing bandwidth and signal integrity. As each new standard involves, line cards must typically be replaced to upgrade the service.

What is needed is a less rigid signal processing architecture that supports scalability of resources, and allows a more flexible hardware response to existing and evolving XDSL standards.

SUMMARY OF THE INVENTION

The present invention advantageously provides a method and apparatus for extending existing fiber and local area networks across digital subscriber lines, at matching data rates. The method and apparatus also allows data transport in any of a number of popular packet structure types including but not limited to: 802.X, ATM, etc. A bundler, un-bundler and sequencer is disclosed for use in controlling and driving opposing sets of logical or physical modems to drive multiple-subscriber lines with multiple communication channels. The sequencer determines subscriber requirements such as maximum and minimum bandwidth and quality of service. The sequencer also determines bandwidth availability and status of multiple subscriber lines from which a bundle may be formed. The bundler couple to the sequencer and implement header or headerless insertion of multiple channels in round robin sequence into the X-DSL frames at data rates which correspond with subscriber requirements. The un-bundler reverses the process of the bundler and passes the appropriate packet data onto the corresponding network.

In an embodiment of the invention dynamic bonding is implemented to allow lines to be added or dropped from the bond. In an alternate embodiment of the invention dynamic bundling is implemented to allow bursty data transmission on selected active ports at higher rates during idle intervals of other ports in the bundle.

BRIEF DESCRIPTION OF THE DRAWINGS

These and other features and advantages of the present invention will become more apparent to those skilled in the art from the following detailed description in conjunction with the appended drawings in which:

FIG. 2A is a hardware block diagram of an opposing set of logical modems each including a bundler, un-bundler and sequencer for communicating across multiple bonded subscriber lines.

FIG. 2B is a hardware block diagram of an opposing set of physical modems each coupled to a bundler, un-bundler and sequencer for communicating across multiple bonded subscriber lines.

FIGS. 4A-E show data structures associated with the dynamic bonding and of subscriber lines.

DETAILED DESCRIPTION OF THE EMBODIMENTS

The present invention advantageously provides a method and apparatus for extending existing fiber and local area networks across digital subscriber lines, at matching data rates. The method and apparatus also allows data transport in any of a number of popular packet structure types including but not limited to: 802.X, ATM, etc. A bundler, un-bundler and sequencer is disclosed for use in controlling and driving opposing sets of logical or physical modems to drive multiple-subscriber lines with multiple communication channels. The sequencer determines subscriber requirements such as maximum and minimum bandwidth and quality of service. The sequencer also determines bandwidth availability and status of multiple subscriber lines from which a bundle may be formed. The bundler couple to the sequencer and implement header or headerless insertion of multiple channels in round robin sequence into the X-DSL frames at data rates which correspond with subscriber requirements. The un-bundler reverses the process of the bundler and passes the appropriate packet data onto the corresponding network.

In an embodiment of the invention dynamic bonding is implemented to allow lines to be added or dropped from the bond. In an alternate embodiment of the invention dynamic bundling is implemented to allow bursty data transmission on selected active ports at higher rates during idle intervals of other ports in the bundle.

Figure 1:
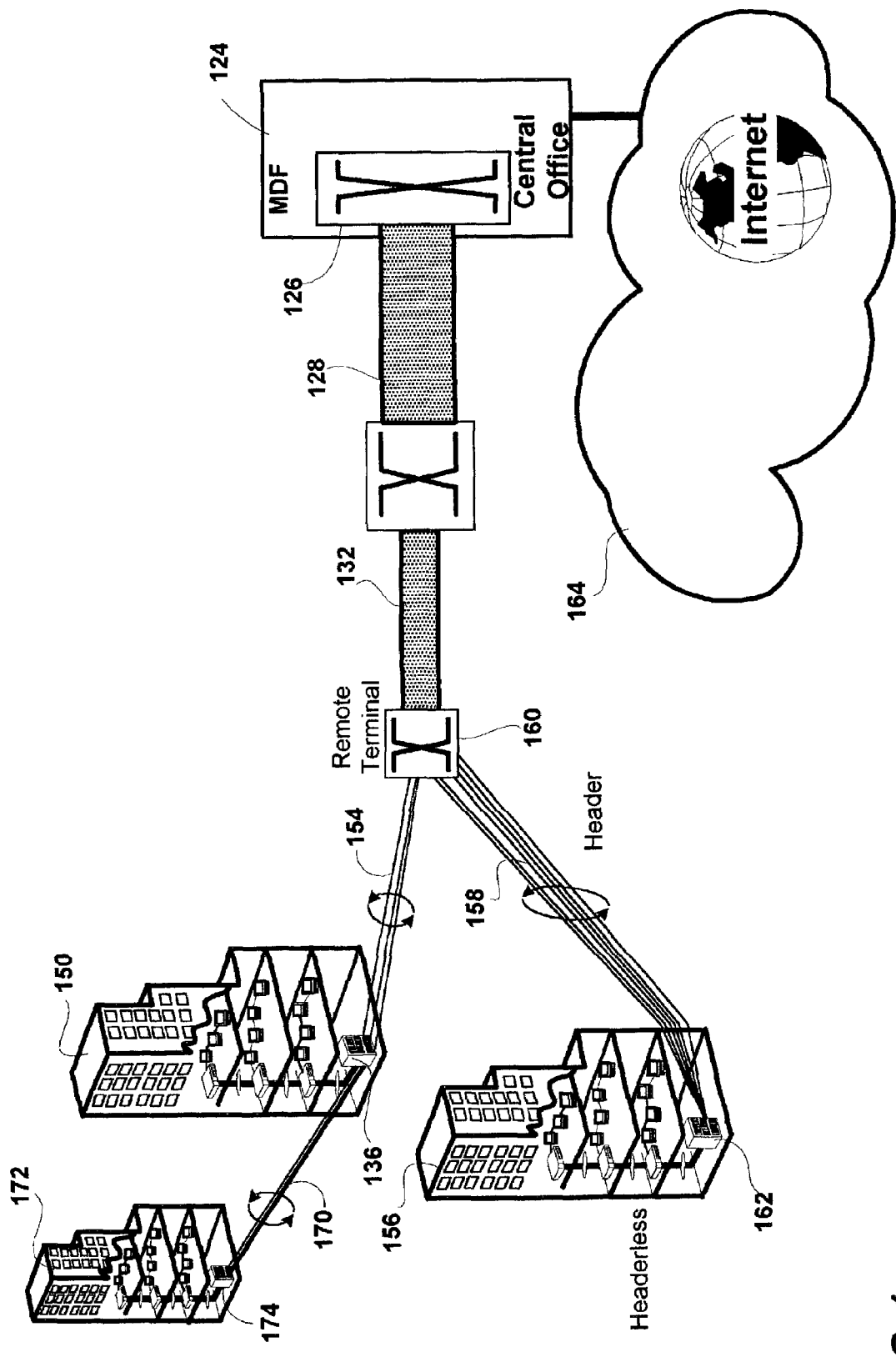
FIG. 1 shows an overall communication environment in which to practice the current invention including dynamic multi-line bonding of subscriber lines between a remote access concentrator and a multi tenant unit (MXU) or between multi-tenant units.

FIG. 1 shows a central office 124 optically coupled via interface 126 and optical links 128, 132 with a remote terminal 160. At the remote terminal 160 subscriber line bundles 154 is used to complete the high speed data links to Offices 150 and 172 and subscriber line bundle 158 is used to complete the high speed data links to Offices 162. MxU Concentrators 136, 174, and 162 are provided in the basement of Offices 156, 172 and 150 respectively. The multi-line bonding and bundling methods and apparatus described and discussed in the following description can be used on opposing ends of subscriber line bundles between the remote terminal and the MxU, or between the MxU of buildings 150, 172 to extend the reach of the high speed data path, or between an MxU in a basement and the networks on individual floors of a building.

FIG. 2A is a hardware block diagram of an opposing pair of logical modems 201, 233 each including a bundler, un-bundler and sequencer for communicating across multiple bonded 232 subscriber lines 224, 226, 228, 230. Modem 201 provides multiple ports 246 to couple with communication network 100. Modem 233 provides multiple ports 246 to couple with communication network 244. Each logical modem includes a common digital signal processor driving multiple analog and hybrid front ends (AFEs) and (HFEs) respectively. Logical modem 201 includes AFEs 216-218 and HFEs 220-222. A DSP 200 communicates via packets 300 with the AFEs to send and receive data. The DSP includes in addition to the traditional transmit and receive path components 210, 212, 214 a bundler 202 and un-bundler 206 on the transmit and receive paths respectively. The bundler allows data from multiple ports to be bundled for transport on the multiple-bonded subscriber lines 232. The un-bundler 206 performs a complementary function on the receive path. The relative bandwidth given to each port, and other specific parameters associated with transmission and reception of the bundled data are determined by the sequencer 208. Logical modem 233 includes AFEs 238-240 and HFEs 234-236. A DSP 240 communicates via packets 300 with the AFEs to send and receive data. DSP 240 contains components similar to those shown in the DSP of the logical modem.

FIG. 2B is a hardware block diagram of an opposing set of physical modems each coupled to a bundler, un-bundler and sequencer for communicating across multiple bonded subscriber lines. The multi-line bonder 250 controls a bank 264 of physical modems. The multi-line bonder 272 controls an opposing bank 268 of physical modems. Each multi line bonder 250 and 272 is coupled to a corresponding network 100, 244 via multiple ports 246. The multi-line bonder 250 includes an network interface 252 coupled to network 100. A bundler 256, un-bundler 254 and sequencer 258 are shown coupled to one another to handle bundling and unbundling of data from the multiple ports onto the physical modems via transmit and receive multiplexers 262 and 260 respectively.

In an alternate embodiment of the invention opposing modems forming a transmitting and receiving set can mix logical modems such as shown in FIG. 2A with Physical modems and associated external multi-line bonder shown in FIG. 2B.

Figure 3:
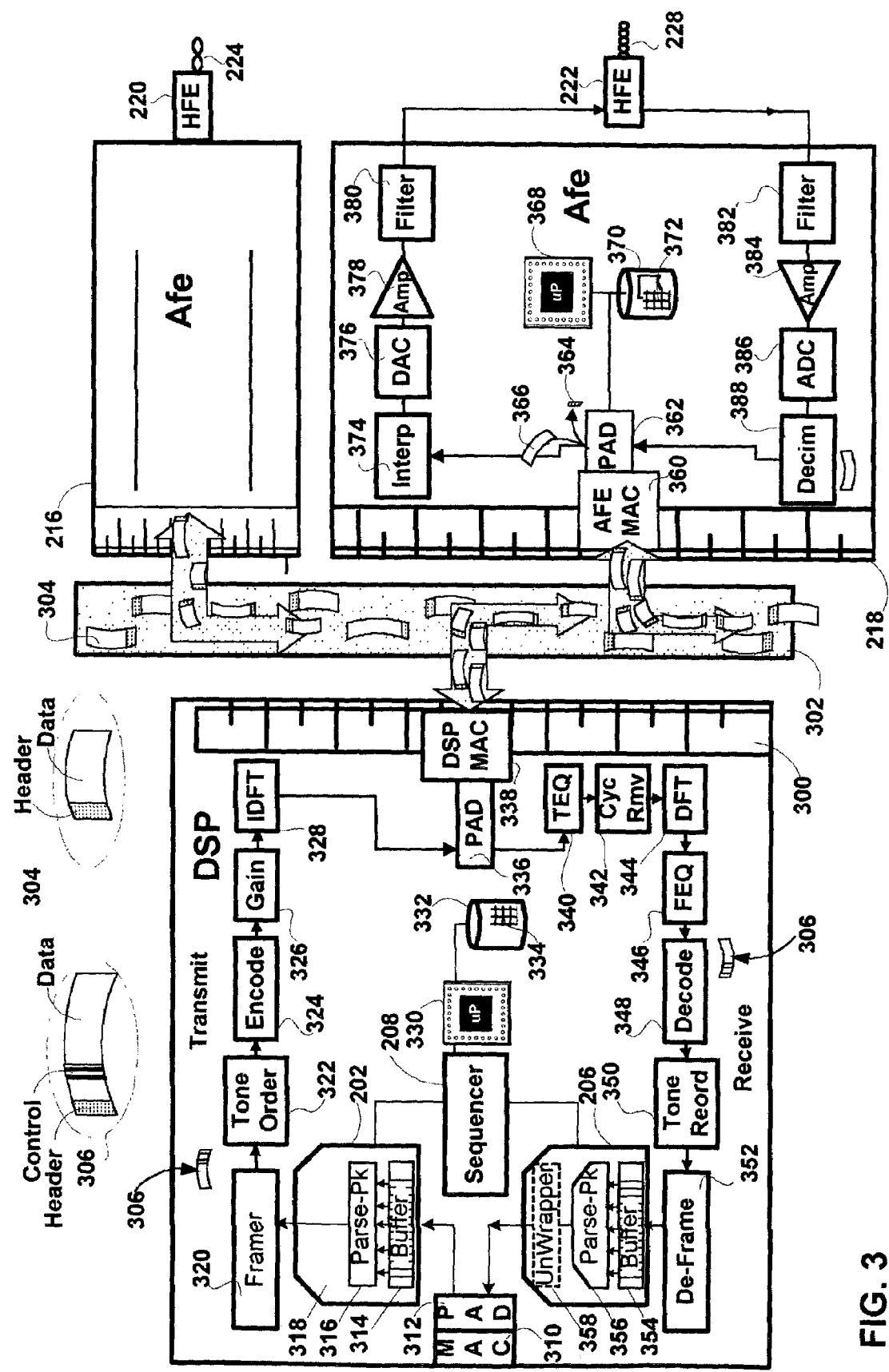
FIG. 3 is a detailed hardware block diagram of a logical modem with an integrated bundler, un-bundler and sequencer for communicating across multiple bonded subscriber lines.

FIG. 3 is a chip level view of a logical modem capable of dynamic bonding of multiple subscriber lines and of bundling and unbundling multiple ports on the bonded lines. In an embodiment of the invention multiple AFE's chips 216-218 connect with a DSP chip 300 across bus 302. They all may be mounted on the line card. Packets of raw data are shown being transported between the DSP and AFEs as well as within each DSP and AFE. Packet processing between the DSP and AFE chips involves transfer of bus packets 304. Packet processing within a DSP may involve device packets 306 (See FIG. 5). Packet processing within an AFE may involve raw data packets 366. These will be discussed in the following text. In this architecture a DSP 300 handles processing for a number of channels of upstream and downstream subscriber line communications via a number of analog front ends (AFE's) 304 and 310. Each AFE in turn accepts packets associated with one or more of subscriber lines to which each AFE is coupled. AFE 304 is shown coupled via HFE 306 with subscriber line 308. AFE 310 is shown coupled via HFE 312 with subscriber line 314. The logical modem shown in FIG. 3 supports packet based processing of data between a DSP and AFE as well as within each DSP and AFE. Packet processing between DSP and AFE modules involves transfer over bus 302 of bus packets 310 each with a header and data portion. The header contains information correlating the data with a specific channel and direction, e.g. upstream or downstream, of communication. The data portion contains for upstream traffic digitized samples of the received data for each channel and for downstream packets digitized symbols for the data to be transmitted on each channel.

Packet processing within a DSP may involve device packets 316. The device packets may include a header, a control portion and a data portion. The header serves to identify the specific channel and direction. The header may contain control information for the channel to be processed. The control portion may also contain control parameters for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line. These modules, AFE and DSP, may be found on a single universal line card, or displaced from one another on separate line cards linked by a DSP bus or they may be found displaced across an ATM network.

The DSP 300 includes, a DSP medium access control (MAC) 338 which handles packet transfers to and from the DSP bus 302. The MAC couples with a packet assembler/disassembler (PAD) 336. For received DSP bus packets, the PAD handles removal of the DSP bus packet header and insertion of the device header and control header which is part of the device packet 306. The content of these headers is generated by the core processor 330 using statistics gathered by the de-framer 352. These statistics may include gain tables, or embedded operations channel communications from the subscriber side. The PAD embeds the required commands generated by the core processor in the header or control portions of the device packet header. Upstream device packets (Receive packets) labeled with the appropriate channel identifier are passed through the time domain equalizer (TEQ) 340 and the cyclic prefix/suffix remover 342 to the discrete Fourier transform (DFT) engine 344. The DFT engine fetches packets and processes the data in them in a manner appropriate for the protocol, channel and command instructions, if any, indicated by the header. The processed data is then passed to the frequency domain equalizer (FEQ) 346, the decoder 348, the tone re-orderer 350 and the de-framer 352. Each module reads the next device packet and processes the data in it in accordance with the instructions or parameters in its header. The processed de-framed data is passed from the de-framer 352 to the un-bundler 206.

The un-bundler includes: a buffer 354, a parser-packer 356 and an un-wrapper 358. The un-bundler separates data by port and repacks it into corresponding packet frames in Ethernet, ATM or other packet protocol. The data from each frame for each successive channel is buffered in buffer 354. The parser communicates with the sequencer 208 and or the tables maintained by the sequencer in memory 332. Those tables shown in FIGS. 4A-E contain parameters associated with bundling and unbundling of multiple-channels within a single frame. Where the de-framed data includes headers (See FIG. 6) the parser operates in conjunction with the un-wrapper to derive information from the headers necessary to unpack the data and affiliate it with the proper port and packet and then to remove the header information. The un-bundled data is passed to the packet assembler/dis-assembler (PAD) 312 and medium access control (MAC) 310 for placement of the packet on the corresponding packet network.

Control of the receive modules, e.g. DFT engine 344, FEQ 346, etc. is implemented as follows. The core processor 330 gathers statistical information on each channel including gain tables, or gain table change requests from the subscriber as well as instructions in the embedded operations portion of the channel. Those tables 334 are stored by the core processor in memory 332. When a change in gain table for a particular channel is called for the core processor sends instructions regarding the change in the header of the device packet for that channel via the PAD and writes the new gain table to a memory which can be accessed by the appropriate module in the receive path. This technique of in band signaling with packet headers allows independent scheduling of actions on a channel by channel basis in a manner which does not require the direct control of the core processor. Instead each module in the receive path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different XDSL protocols, e.g. a packet with ADSL sample data followed by a packet with VDSL sampled data. For example as successive packets from channels implementing G.Lite, ADSL and VDSL pass through the DFT 348 the number of tones will vary from G.lite, ADSL and for VDSL. The framer 320 and de-framer 352 will use protocol specific information associated with each of these channels to look for different frame and super frame boundaries. The measured level of each tone is maintained by processor 330 in memory 332. This same memory may be utilized for calculating the inverse channel model for each of the channels to determine the amount of pre-compensation to be applied to downstream data on each of the channels.

On the downstream side (Transmit path) the same architecture applies. Packet data is wrapped by PAD 312 with a device header the contents of which are again dictated by the core processor 330. That processor may embed control information related to the processing of each channel in the packets corresponding to that channel. Packets are passed to the bundler 202. The bundler includes: a buffer 314, a parser-packer 316 and an wrapper 318. The bundler parses the data from each packet from multiple ports packs it with or without a header into corresponding packet frames in Ethernet, ATM or other packet protocol. The data from each packet for each successive channel is buffered in buffer 314. The parser 316 communicates with the sequencer 208 and or the tables maintained by the sequencer in memory 332. Those tables shown in FIGS. 4A-E contain parameters associated with bundling and unbundling of multiple-channels within a single frame. Where the data is to be packetized with headers (See FIG. 6) the parser operates in conjunction with the wrapper to place the appropriate headers and flags in the packet data. This may include HDLC and other embedded headers. The bundled data is passed to the framer 320 for placement in the appropriate DSL frame. From the framer data is processed in the tone orderer 322, encoder 324, gain scaler 326 and inverse discrete Fourier transform (IDFT) engine 328. On the transmit path as well incline control headers 306 may be utilized to control processing of the digital components on the transmit path. These later headers are not however the subject of this invention. These headers are discarded before transmission to the AFE.

From the IDFT 328 each updated device packet with a digitized symbol(s) for a corresponding channel is sent to PAD 336 where any device or control header is removed. The DSP PAD places the DSP packet with an appropriate header to DSP MAC 338 for placement onto the DSP bus 302 for transmission to the appropriate AFE and the appropriate channel and subscriber line within the AFE.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet 304 on the bus 302 directed to AFE 218 is detected by AFE MAC 360 on the basis of information contained in the packet header. The packet is passed to PAD 362 which removes the header 364 and sends it to the core processor 368. The packet's header information including channel ID is stored in the core processor's memory 370. The information is contained in a table 372. The raw data 366 is passed to interpolator 374. On the transmit path, the interpolator 374 reads a fixed amount of data from each channel. The amount of data read varies for each channel depending on the bandwidth of the channel. The amount of data read during each bus interval is governed by entries in the control table for each channel which is established during channel setup and is stored in memory 370. The interpolator up samples the data and passes it to the digital-to-analog converter (DAC) 376. The DAC converts the digitized symbol for each of the input signals on each of the input signal lines/channels to corresponding analog signals. These analog signals are introduced to the amplification stage 378, from which they are passed to analog filter 380 and then via an associated HFE, e.g. HFE 222 to a corresponding subscriber line e.g. subscriber line 228.

On the upstream path, the receive path, individual subscriber lines couple to the receive path. Subscriber line 228 couples through HFE 222 to the analog filer 382. The analog filter provides input to the corresponding line amplifier 384. From the line amplifier the received analog data is digitized in the analog to digital converter (ADC) 386. The digitized output is passed through the digital filter 388 to the PAD 362. The PAD wraps the raw data in a DSP header with channel ID and other information which allows the receiving DSP to properly process it. From the PAD it is passed to the AFE MAC 360 for wrapping in a bus packet 304 and delivery to the DSP 300.

FIGS. 4A-E show data structures associated with the dynamic bonding and of subscriber lines. These tables are maintained by the sequencer and utilized by the bundler and un-bundler to determine how to pack data on the bonded physical channels to maximize throughput and meet subscriber requirements. Those tables include the bundle table 400, the subscriber table 420 the frame partition table 430 and the default 450 and temporary 466 port sequence tables shown in FIGS. 4A-E respectively. The bundle table stores parameters on lines available for bundling 412, the associated analog front end 414, the round robin sequence 410, the protocol 408, the status 406 and the upstream and downstream symbol sizes 404-402. The subscriber table stores subscriber parameters for associated Ethernet ports 428 including: guaranteed bandwidth 426, bandwidth cap 424 and quality of service 422. The frame partition table stores the actual number of bytes of data associated with each port 440 on each active physical channel 432-438. The non-volatile port sequence table 450 shows the port-to-partition relationship established during the initial setup of the 4 wire bundle (See FIG. 4D). This table contains the default parameters which correlate ports with partitions. The temporary or volatile port sequence table is utilized in embodiments of the invention in which idle detection is implemented for temporary re-assignment of ports-to-partitions during an idle interval on one of the ports.

Figure 5A:
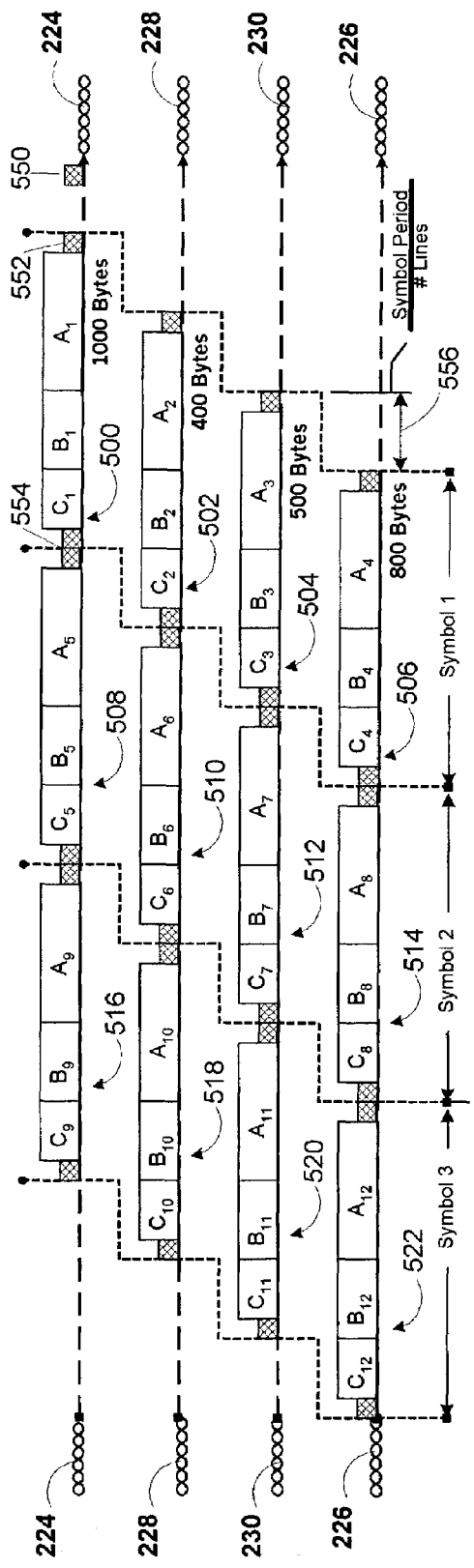
FIGS. 5A-B show the data structures associated with dynamic multiplexing of packets from multiple ports across multiple bonded subscriber lines.
Figure 5B:
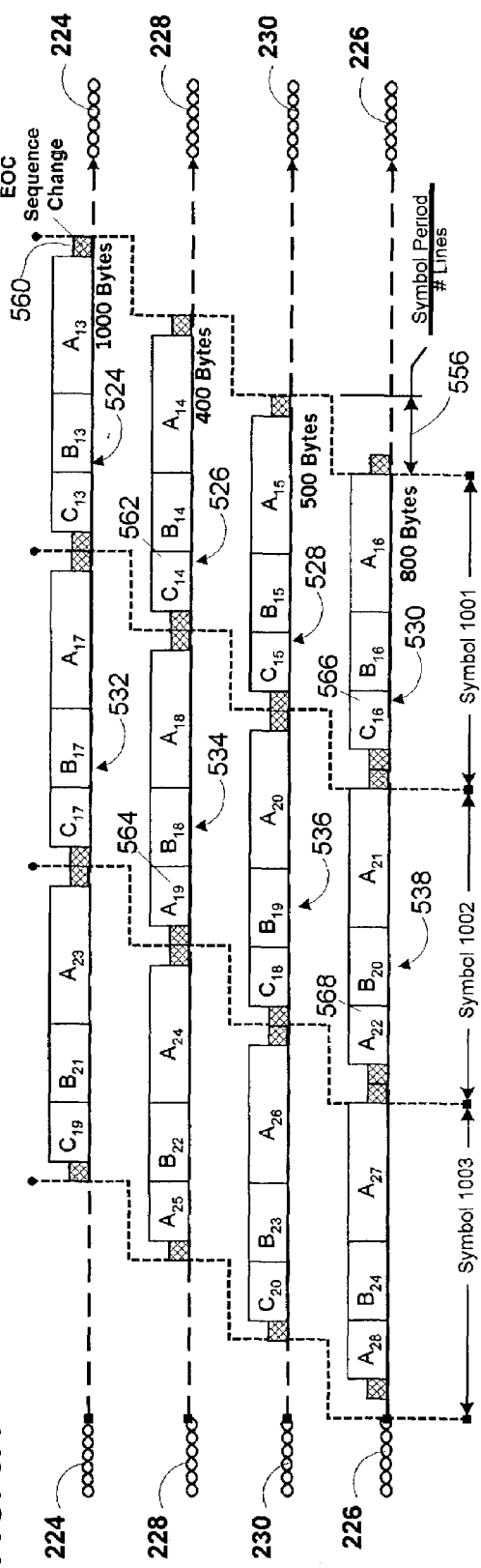

FIGS. 5A-B show the data structures associated with dynamic multiplexing of packets from multiple ports across multiple bonded subscriber lines. Four subscriber lines 224-230 are bonded. Successive symbol intervals and associated frames are shown for each of the physical channels 224-230. Successive reference numbers 500-538 refer to frames which are un-bundled in ascending order from a first received frame 500 to a last received frame 538. The round-robin bundling sequence is 224, 228, 230, 226 as indicated in the Bundling table 400, column 410 as shown in FIG. 4A. The offset 556 for the symbol frames from one another are in the example shown ¼ the symbol period where 4 is the number of active physical channels that are bonded. As physical channels are dropped or added to a bundle the offset may be varied to correspond inversely with the number of lines in the bundle thereby minimizing packet transfer latency. In FIGS. 5A-B frames are packed in a round robin sequence in the first and subsequent symbol intervals. The partition sizes and the ports within each partition are determined by the bundler based on entries in the tables shown in FIGS. 4A-E as maintained by the sequencer. Each frame includes X-DSL or other standard frame headers. Headers 552-554 for the initial frame 500 of the bonded set are referenced. The embedded operations channel within the existing X-DSL frame is used to signal to the un-bundler and sequencer on the opposing set of modems the superframe and frame number at which to commence reception of a bundled sequence. In the example shown the header 550 and associated embedded operations channel of a prior X-DSL frame were used to signal the onset. Throughout symbol intervals 1-3 shown in FIG. 5A and up until the onset of idle detection in symbol interval 1001 shown in FIG. 5B the port-to-partition loading is the same across all physical channels. There are three partitions, one for each port in the example shown, and ports A, B and C are loaded in respectively the first through third partition in each frame. The embedded operations channel on frame 524 or a prior DSL frame is used to signal the un-bundler and sequencer on the receiving modem set that a temporary port-to-partition loading will be implemented, in a subsequent symbol interval, which in this example is symbol interval 1002. This would be appropriate when for example the bundler on the transmit path of one of the sets of modems detects an idle port, thereby creating temporary bandwidth availability in the corresponding partition. Responsive to the idle detection the bundler and sequencer generate a temporary port-to-partition re-sequencing which is stored in the temporary port sequence table shown in FIG. 4E. The new port sequence is transmitted to the opposing un-bundler and sequencer and on the following symbol interval 1002 the third partition in each frame on selected ones of the subscriber lines, e.g. physical channels 226 and 228 is packed with data from port A rather than idle bits associated with the Idle port C. Thus before idle changeover, the third partition 562 of frame 526 on line 228 in symbol interval 1001 contains the default port C for the $3^{rd}$ partition on line 228. After idle changeover in symbol interval 1002 the third partition 564 of frame 534 on line 228 contains the temporary port assignment A. The other line subject to a change in port-to-partition mapping is line 226. Thus before idle changeover, the third partition 566 of frame 530 on line 226 in symbol interval 1001 contains the default port C for the $3^{rd}$ partition on line 228. After idle changeover in symbol interval 1002 the third partition 568 of frame 538 on line 226 contains the temporary port assignment A. This ability to respond to idle intervals on ports and to return to initial port-to-partition mapping when no idle is detected greatly increases the actual bandwidth of a bundle since packet based communications tend to be bursty.

Figure 6:
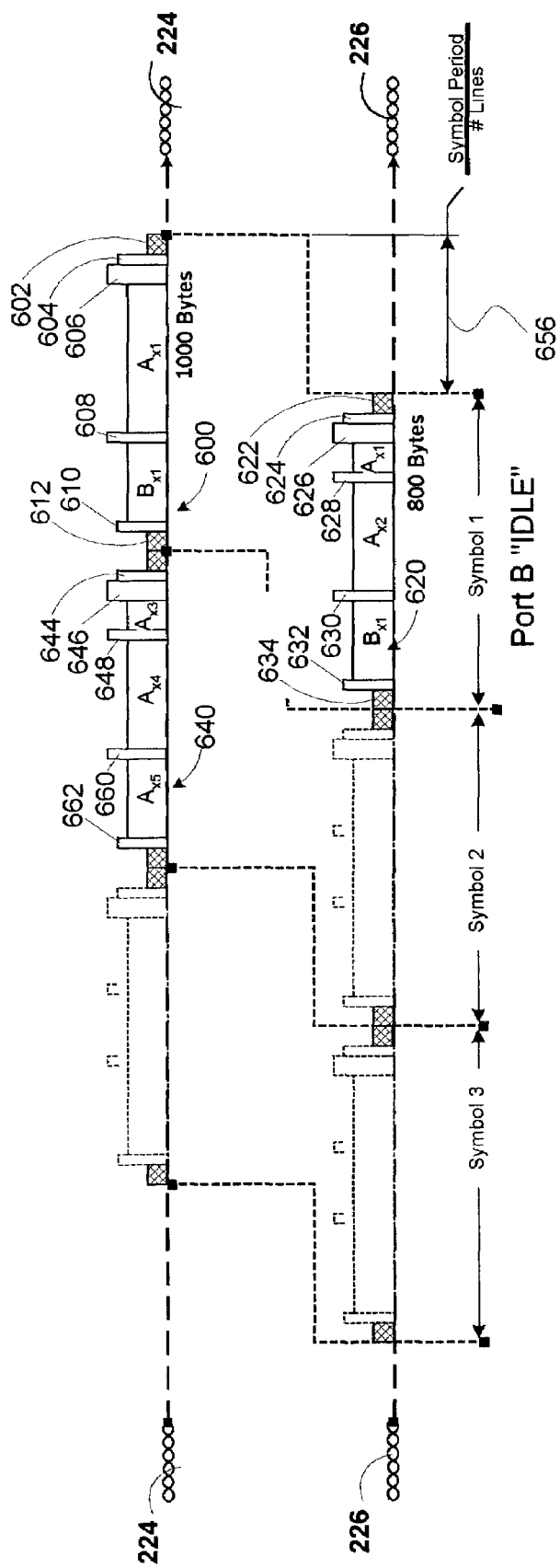
FIG. 6 shows the data structures, including inline headers, associated with dynamic multiplexing packets from multiple ports across multiple subscriber lines.

FIG. 6 shows an alternate embodiment of the invention in which headers are used in the data transported across the bundled physical channels. This method provides a more generic method, which does not rely on the DSL standards messaging. This might be needed in cases such as: working with existing modems without any change and re-assigning bandwidths between user Ethernet ports more dynamically on a packet by packet basis, without sending any messages to indicate change in bandwidth assignment.

Most of the existing DSL modems support a raw data interface, where the data is assumed to be a stream of bytes which are transported across the link. In ADSL, this is known as the synchronous transfer mode (STM) interface, and is typically a bit-serial or a byte-wide interface. The bundler and sequencer module 250 (See FIG. 2B) which performs the bonding of the packet streams associated with each incoming port can also perform any required packet encapsulation and rate matching.

The example shown in FIG. 6 assumes the case where there are two DSL lines 224 and 226 in the bonded bundle. This example assumes there are two Ethernet ports. The Ethernet packets coming on the first port are indicated by Ax1, Ax2, etc. and the Ethernet packets on the second port are indicated by Bx1, Bx2, etc.

The incoming packet streams are packed into encapsulated frames 600,640,620 (See FIG. 6) similar to the header-less case, and then transported across the bundle. This embodiment of the invention does not rely on the DSL framing or messaging structures. The frames are independently encapsulated with High Level Data Link Control (HDLC) or other encapsulation standard, so that the receiving set of modems in the bundle can determine the encapsulated frame boundaries without relying on DSL frame structure. There is an HDLC header 604, 644, 624 (See FIG. 6) prefixed to the start of the encapsulated frame and an HDLC trailer containing a CRC 610, 662, 632 attached at the end of the encapsulated frame 600, 640, 620 respectively. Each encapsulated frame is further broken into partitions, with a partition carrying either a complete packet or part of an packet for an associated port. Headers 606, 646, 626 are added to each encapsulated frame and to each partition 608, 648, 660, 628, 630. These headers communicate to the un-bundler on opposing set of modems how to re-assemble partitions and frames into multiple Ethernet packets. In this embodiment of the invention no pre-arranged sequence or partition size is required.

In the example shown in FIG. 6, the encapsulated frame 600 (See FIG. 6) as well as other frames on line 224 carry 1000 bytes per encapsulated frame and the encapsulated frames on line 226, e.g. encapsulated frame 620, carry 800 bytes per encapsulated frame. In the example in FIG. 6, the encapsulating frame sizes are chosen to match the payload of the DSL frames. This method can allow the encapsulated frames to be different in size than the DSL frame. In certain situations, such as low data rate lines, it is desirable to make the bundling frame to be equal to multiple DSL frames.

Header types associated with an embodiment of the invention are shown in FIG. 6. Two header types are shown: an encapsulated frame header (See FIG. 6 reference numbers 606, 646, 626) and a partition header (See FIG. 6 reference numbers 608, 648, 660, 628, 630).

The encapsulated frame header contains the following fields:

Encapsulated-Frame-Sequence-Number (16 bits): which indicated the global sequencing of frame across all lines in the bundle. The number is utilized by the un-bundler on the receive side.

End-Packet-Flag (1 bit): if 1, then the first partition is the last part of a packet.

Next-Partition-Offset (15 bits): offset of the start of the next partition in this frame. If there is no more partitions following this partition, then this field is set to zero.

Each partition has a Partition Header which contains the following fields:

End-Packet-Flag (1 bit): if 1, then this partition is the last part of a packet.

Next-Partition-Offset (15 bits): offset of the start of the next partition in this frame, and if there are no more partitions following this partition, then this field is set to zero.

Figure 7:
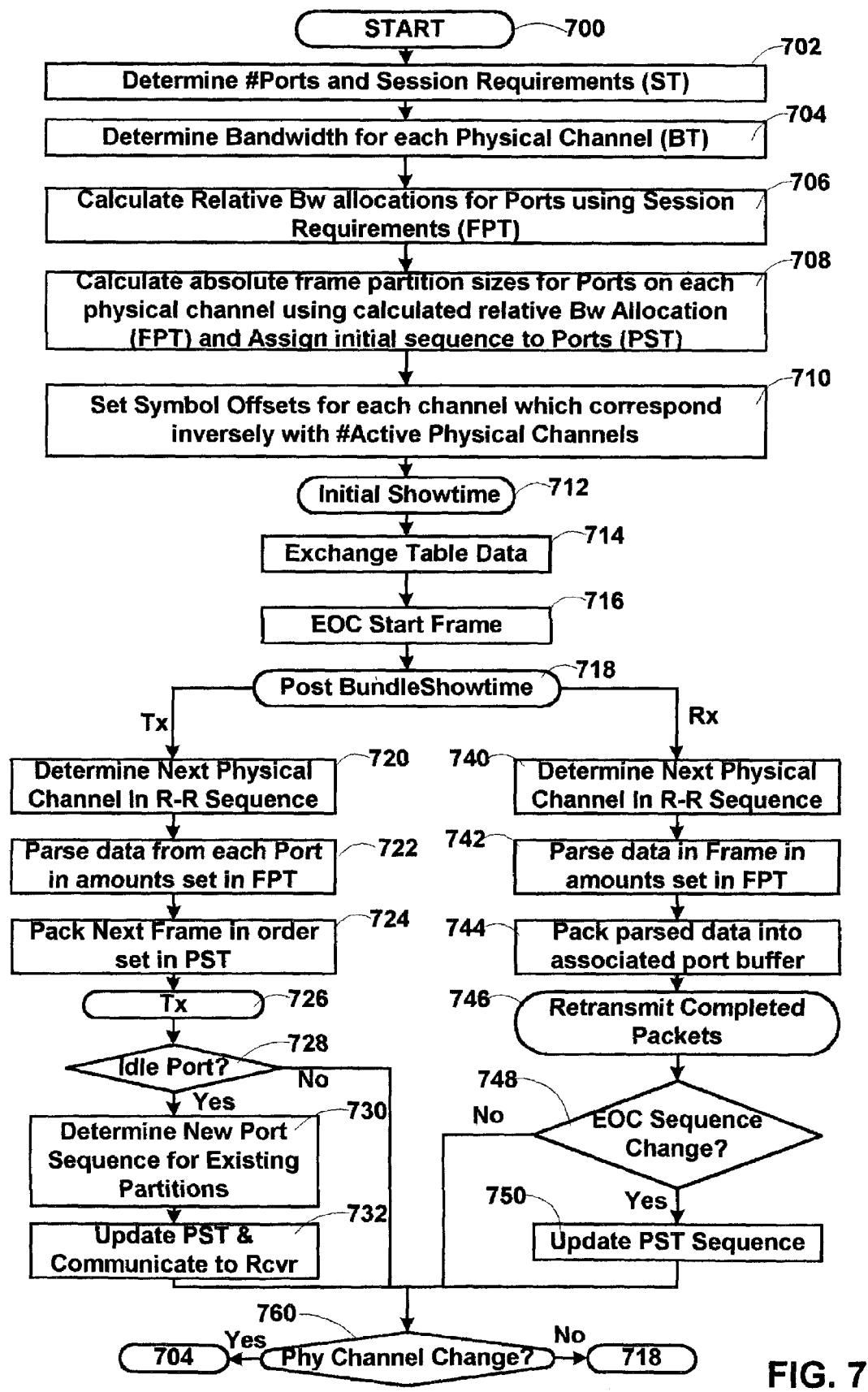
FIG. 7 is a process flow diagram of the processes associated with bundling, unbundling and sequencing of data from multiple ports across multiple bonded subscriber lines.

FIG. 7 is a process flow diagram of the processes performed by the bundler and sequencer associated with either of the opposing sets of modems during initialization and Showtime. After initialization in process 700 control is passed to process 702 in which the number of active ports and the session requirements for each are determined. Each port as discussed above may correspond with an Ethernet or ATM communication channel for example. For each port the session requirements if any are determined. These may include parameters such as those recorded in the subscriber table 420 (See FIG. 4) such as bandwidth maximum and minimum as well as quality of service. Each physical channel is also assigned a sequence number (See FIG. 4A, Ref 410) in the round-robin sequence in which data is transmitted on each active physical channel, e.g. subscriber line, of the bundle. Control is then passed to process 704 in which the bandwidth for each physical channel, e.g. subscriber line, is determined during system initialization. These parameters, such as upstream and downstream symbol size are shown in the bundle table 400 (See FIG. 4). Control is then passed to process 706 in which the sequencer (See FIG. 2A Ref 208; FIG. 2B Ref 258) determines the relative bandwidth allocations for each port. This calculation may be made on the basis of the subscriber requirements for each port (See Subscriber Table 420, FIG. 4) and the available bandwidth for all physical channels that will be bonded (See Bundle Table 400, FIG. 4). In the example shown in FIGS. 4A-E Ports A, B, C are allocated relative percentages of the total available bandwidth at levels of 50%, 30%, and 20%. A number of different algorithms may be used to calculate relative bandwidths including allocation based on maximum bandwidth limits, or minimum bandwidth limits or quality of service or a weighted combination of the above, for example. Once relative bandwidths are calculated control is passed to process 708. In process 708 absolute frame partitions sizes are calculated across all the active physical channels that will be bundled (See FIG. 4C, Frame Partition Table Ref 430). Next specific ports are associated with each frame partition using a port sequence number, 1, 2, 3 . . . for example. The port assigned a port sequence number 1 will be transported in the first frame partition, the port assigned the port sequence number 2 will be transported in the second frame partition etc. (See FIGS. 4D-E tables 450, 466). Next in process 710 symbol offsets in terms of micro-seconds are computed for each active physical channel. In an embodiment of the invention, the actual offset of a Physical Channel "n" in terms of micro-seconds relative to a prior channel in the round robin sequence are determined as set forth in the following Equation 1:

$$\text{Offset} = \frac{SS}{N} \qquad \text{Equation 1}$$

where N is the total number of active physical channels and SS is the symbol duration in micro-seconds for each physical channel. Across the various DSL protocols 250 micro seconds is the symbol duration. Absent the offset introduced in step 710 latency will be equal to or greater than the symbol duration. With offsets introduced in step 710 and shown in FIGS. 5A-B and FIG. 6 latency decreases as the number of physical channels in a bundle increases. Where a bundle includes four active physical channels latency with offsets is reduced by 75% over the single channel case to ¼ the symbol duration on any line. In DSL bundles this corresponds with a reduction in latency to 62.5 micro seconds.

Next in process 712 Showtime is initiated with all active physical channels up and running between the logical and/or physical modems involved in the bonding. The parameters calculated in processes 702-710 are exchanged between the modems in process 714. In process 716 the embedded operations channel or other in line communication is used to synchronize the round-robin sequence on the opposing set of modems which are handling the bundle of physical channels. DSL standards have the concept of a frame & superframe number on each channel. The synchronization can be achieved by specifying the frame+superframe numbers of each channels which form a round-robin sequence. In the embodiment of the invention shown in FIG. 6 the use of headers in the bundled data avoids the need for a synchronization via embedded operations channels since the additional headers make this redundant. Next in process 718 the new bundle is established and bundled communication begins. In physical or logical modems this includes concurrent transmission and reception of data on the upstream and downstream paths. The transmission and receive paths includes bundle related processes 720-732 and 740-750 respectively.

Actual bundling of data and transmission thereof commences in process 720. In process 720 the next physical channel in the round robin sequence is determined from column 410 in the bundle table 400 (See FIG. 4A). Next in process 722 incoming data for each port that will be bundled into the frame(s) on the next channel in the sequence are parsed by the parser-packet 316 (See FIG. 3) on amounts for each port defined in the frame partition table (See FIG. 4C). Next in process 724 the parser-packet packs the parsed data into the frame in the order defined in the port sequence table (See FIG. 4D) and the frame(s) are transmitted on the corresponding physical channel in process 726. In an embodiment of the invention which includes headers in the transmitted data, the wrapping of parsed data with headers would be effected in process 724 as well (See FIG. 6).

Next in process 726 the processes associated with dynamic reallocation of ports to partitions to accommodate bursty communications are initiated. This capability temporarily increases the bandwidth available in the bundle for one or more ports when an idle condition is detected on others of the ports assigned to the bundle. In process 726 a determination is made as to whether an idle condition on one of the ports associated with the bundle is detected. If no idle is detected then control passes directly to process 760. Where an idle port is detected control is passed to process 730. In process 730 a determination is made based on the subscriber requirements of the other ports in the bundle (See Subscriber Table 420, FIG. 4B) as to what new port-to-partition assignments are appropriate to take advantage of the extra bandwidth available in the bundle as a result of the idle channel. The sequencer determines that new port sequence and stores it in a temporary instance of the port sequence table (See FIG. 4E). In process 732 this updated instance of the port sequence table is communicated to the opposing set of modems. On the next round of the round robin sequence, i.e. processes 722 will parse data on the ports that are not idle and process 724 will pack the next frame with the parsed data in a sequence corresponding with the temporary instance of the port sequence table. Where no idle port processes 722-724 will revert to the non-volatile instance of the port sequence table (See FIG. 4D) for a determination of port packing sequence and amount. Next control passes to process 760. In an alternate embodiment of the invention where headers are utilized, process 732 need not include transmission of the updated port sequence table to the receiving set of modems, since the relevant information will be injected into the headers within the transmitted data.

On the receive path processing commences with process 740. In process 740 the next physical channel in the round-robin sequence is determined. Next in process 742 the data in the received frame on the next physical channel is parsed in the order and amounts specified in the port sequence and frame partition tables (See FIGS. 4C,D,E). Next in process 744 the parsed data is packed into the associated port buffer. When any of the packed packets completes an Ethernet or other packet that packet is re-transmitted in process 746 on the LAN or other network to which the receiving modem set is coupled. Alternately, in the embodiment of the invention shown in FIG. 6 where the transmitted data includes headers, parsing and packing in processes 742 and 744 are conducted according to information contained in the headers in which ports are directly associated with data.

Next in decision process 748 the processes associated with dynamic reallocation of ports to partitions to accommodate bursty communications are initiated on the receive side. In process 748 a determination is made as to whether an embedded operations channel or other communication from the transmitting modem set has been received on the physical channel being processed. If such communication is received, and indicates a change in port sequence then the volatile/temporary instance of the port sequence table is updated in process 750 on the receiving side and control is passed to process 760. Alternately, if no embedded operations channel communication indicating a port sequence change is detected in process 748 then control passes directly to process 760. In an alternate embodiment of the invention where headers are utilized, processes 748-750 are not required since the relevant information is contained in the header portion of the received data.

Decision process 760 initiates another type of dynamic re-allocation of the bundle, in addition to the idle detection discussed above. Decision process 760 initiates dynamic re-allocation based on either the addition or deletion of a physical channel from an existing bundle. If no change in the active or available channels for the bundle is detected control returns to process 718. Alternately, if a change in active channels +/- is detected control passes to process 712. If a channel has been added, a embedded operations channel message is sent to update the channel sequence with the new channel sequence, which contains the added channel. This allows for the effective bundled rate to seamlessly increase with each new channel being added to the channel sequence. Sometimes a DSL channel has to be dropped, for example, due to large number of errors being detected on that DSL channel. In such a case, the embedded operations channel message of the other channels are used to communicate to the other side that the faulty channel is being discarded, and a new channel sequence is communicated.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for communication by subscribers across a plurality of subscriber lines, and the apparatus comprising:
    a first set of modems each including a transmit path, and the first set of modems configured to couple to corresponding ones of a plurality of subscriber lines;
    a sequencer coupled to the first set of modems for determining a sequencing of data from each of the subscribers onto selected ones of the plurality of subscriber lines to correspond with subscriber data rate requirements; and
    a bundler coupled to the transmit path of each modem of the first set of modems to bundle transmitted data for each of the subscribers on the plurality of subscriber lines in the sequence determined by the sequencer; and
    wherein the sequencer and bundler reduce a latency of transmissions by offsetting corresponding symbol intervals of each of the plurality of subscriber lines by an amount of offset which corresponds with the function:

$$\text{Offset} = \frac{SS}{N}$$

where SS corresponds with the symbol interval and N corresponds with a number of active ones of the plurality of subscriber lines.

2. An apparatus for communication by subscribers across a plurality of subscriber lines, and the apparatus comprising:
    a first set of modems each including a transmit path, and the first set of modems configured to couple to corresponding ones of a plurality of subscriber lines;
    a sequencer coupled to the first set of modems for determining a sequencing of data from each of the subscribers onto selected ones of the plurality of subscriber lines to correspond with subscriber data rate requirements; and
    a bundler coupled to the transmit path of each modem of the first set of modems to bundle transmitted data for each of the subscribers on the plurality of subscriber lines in the sequence determined by the sequencer; and wherein the bundler bundles data from each of the subscribers onto the plurality of subscriber lines in a round robin order, in defined amounts and sequence thereby avoiding a requirement of data headers to identify the data transmitted on each of the plurality of subscriber lines.

3. An apparatus for communication by subscribers across a plurality of subscriber lines, and the apparatus comprising:
    a first set of modems each including a transmit path, and the first set of modems configured to couple to corresponding ones of a plurality of subscriber lines;
    a sequencer coupled to the first set of modems for determining a sequencing of data from each of the subscribers onto selected ones of the plurality of subscriber lines to correspond with subscriber data rate requirements; and
    a bundler coupled to the transmit path of each modem of the first set of modems to bundle transmitted data for each of the subscribers on the plurality of subscriber lines in the sequence determined by the sequencer; and wherein the bundler bundles in a round robin order the data from each subscriber onto each of the plurality of subscriber lines in aggregate amounts which correspond in each round with symbol boundaries of each of the plurality of subscriber lines, thereby avoiding a requirement of data headers to identify the data transmitted on each of the plurality of subscriber lines.

4. A system for communication across a plurality of subscriber lines each coupled at opposing ends to a corresponding one of two opposing sets of modems, and with each of the opposing sets of modems comprising:
    a sequencer for determining a sequencing of data onto selected ones of the plurality of subscriber lines which corresponds with data rate requirements for each of a plurality of subscribers; and
    a bundler coupled to the sequencer and to the transmit paths of the corresponding set of modems to bundle data for transmission on the plurality of subscriber lines in a sequence determined by the sequencer; and wherein the sequencer and bundler reduce a latency of transmissions across the plurality of subscriber lines by offsetting corresponding symbol intervals on each of the plurality of subscriber lines by an amount of offset corresponds with the function:

$$\text{Offset} = \frac{SS}{N}$$

where SS corresponds with the symbol interval and N corresponds with a number of active ones of the plurality of subscriber lines.

5. A system for communication across a plurality of subscriber lines each coupled at opposing ends to a corresponding one of two opposing sets of modems, and with each of the opposing sets of modems comprising:
    a sequencer for determining a sequencing of data onto selected ones of the plurality of subscriber lines which corresponds with data rate requirements for each of a plurality of subscribers; and
    a bundler coupled to the sequencer and to the transmit paths of the corresponding set of modems to bundle data for transmission on the plurality of subscriber lines in a sequence determined by the sequencer; and wherein the bundler bundles data from each of the subscribers onto the plurality of subscriber lines in a round robin order, in defined amounts and sequence thereby avoiding headers to identify the data transmitted on each of the plurality of subscriber lines.

6. A system for communication across a plurality of subscriber lines each coupled at opposing ends to a corresponding one of two opposing sets of modems, and with each of the opposing sets of modems comprising:
    a sequencer for determining a sequencing of data onto selected ones of the plurality of subscriber lines which corresponds with data rate requirements for each of a plurality of subscribers; and
    a bundler coupled to the sequencer and to the transmit paths of the corresponding set of modems to bundle data for transmission on the plurality of subscriber lines in a sequence determined by the sequencer; and wherein the bundler bundles in a round robin order the data from each subscriber onto each of the plurality of subscriber lines in aggregate amounts which correspond in each round with symbol boundaries of each of the plurality of subscriber lines, thereby avoiding data headers to identify the transmitted data.

7. A method for communication across a plurality of subscriber lines each coupled at opposing ends to a corresponding one of two opposing sets of modems, and the method for communication comprising:
    calculating relative bandwidth allocations for each of a plurality of subscribers; and bundling data for transmission on the plurality of subscriber lines in a sequence and amount which correlates with the relative bandwidth allocations calculated in the calculating act; and offsetting corresponding symbol intervals on each of the plurality of subscriber lines to reduce a latency of transmissions across the plurality of subscriber lines by an amount of offset which corresponds with the function:

$$\text{Offset} = \frac{SS}{N}$$

where SS corresponds with the symbol interval and N corresponds with a number of active ones of the plurality of subscriber lines.

8. A method for communication across a plurality of subscriber lines each coupled at opposing ends to a corresponding one of two opposing sets of modems, and the method for communication comprising:

calculating relative bandwidth allocations for each of a plurality of subscribers; and bundling data for transmission on the plurality of subscriber lines in a sequence and amount which correlates with the relative bandwidth allocations calculated in the calculating act; and wherein the bundling act further comprises: bundling data from each of the subscribers onto the plurality of subscriber lines in a round robin order, in defined amounts and sequence thereby avoiding headers to identify the data transmitted on each of the plurality of subscriber lines.

9. A method for communication across a plurality of subscriber lines each coupled at opposing ends to a corresponding one of two opposing sets of modems, and the method for communication comprising:

calculating relative bandwidth allocations for each of a plurality of subscribers; and bundling data for transmission on the plurality of subscriber lines in a sequence and amount which correlates with the relative bandwidth allocations calculated in the calculating act; and wherein the bundling act further comprises: bundling in a round robin order the data from each subscriber onto each of the plurality of subscriber lines in aggregate amounts which correspond in each round with symbol boundaries of each one of the corresponding subscriber lines, thereby avoiding headers to identify the data transmitted on each of the plurality of subscriber lines.

* * * * *